(12) United States Patent
Guan et al.

(10) Patent No.: US 11,288,822 B2
(45) Date of Patent: Mar. 29, 2022

(54) METHOD AND SYSTEM FOR TRAINING IMAGE-ALIGNMENT PROCEDURES IN COMPUTING ENVIRONMENT

(71) Applicant: PANASONIC INTELLECTUAL PROPERTY MANAGEMENT CO., LTD., Osaka (JP)

(72) Inventors: Xibeijia Guan, Singapore (SG); Chandra Suwandi Wijaya, Singapore (SG); Vasileios Vonikakis, Singapore (SG); Ariel Beck, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 248 days.

(21) Appl. No.: 16/827,468

(22) Filed: Mar. 23, 2020

(65) Prior Publication Data
US 2021/0295543 A1    Sep. 23, 2021

(51) Int. Cl.
*G06K 9/62*   (2022.01)
*G06T 7/33*   (2017.01)
*G06T 7/00*   (2017.01)

(52) U.S. Cl.
CPC .......... *G06T 7/337* (2017.01); *G06T 7/0002* (2013.01); *G06T 2200/24* (2013.01); *G06T 2207/20081* (2013.01); *G06T 2207/20084* (2013.01); *G06T 2207/20101* (2013.01); *G06T 2207/20104* (2013.01); *G06T 2207/30168* (2013.01)

(58) Field of Classification Search
CPC ............... G06T 7/337; G06T 7/0002; G06T 2207/20081; G06T 2200/24; G06T 2207/20101; G06T 2207/30168; G06T 2207/20104; G06T 2207/20084
USPC ........................................................ 382/156
See application file for complete search history.

(56) References Cited

U.S. PATENT DOCUMENTS 6,266,453 B1    7/2001  Hibbard et al.
2016/0028967 A1    1/2016  Sezer et al.

FOREIGN PATENT DOCUMENTS

WO    2013091088 A1    6/2013

*Primary Examiner* — Stephen P Coleman
(74) *Attorney, Agent, or Firm* — McDermott Will & Emery LLP (57) ABSTRACT

The present subject matter refers a method for training image-alignment procedures in a computing environment. The method comprises communicating one or more images of an object to a user and receiving a plurality of user-selected zones within said one or more through a user-interface. An augmented data-set is generated based on said one or more images comprising the user-selected zones, wherein such augmented data set comprises a plurality of additional images defining variants of said one or more communicated images. Thereafter, a machine-learning based image alignment is trained based on at-least one of the augmented data set and the communicated images.

19 Claims, 8 Drawing Sheets

Non-aligned images
Fig. 6A

Aligned Images
Fig. 6B

METHOD AND SYSTEM FOR TRAINING IMAGE-ALIGNMENT PROCEDURES IN COMPUTING ENVIRONMENT

TECHNICAL FIELD

The present invention generally relates to digital image processing, specifically towards processing an image with respect to its image-frame.

BACKGROUND

In state of the art systems and methods of pre-processing a distorted-image, the distorted image is aligned with a reference image before computing a quality metric during inspection. The process of aligning a distorted image with a reference image may also variously be referred to as "registering" or "registration". The methods of image quality assessment of a distorted image are based on a specific form of comparison of the distorted image with a reference image. The alignment facilitates existing full reference quality-assessment methods to generate a quality metric that corresponds with a visual-assessment.

More specifically, in any visual inspection task, one of the initial-steps is to localize the object or determine the location of the object within the image. This at-least facilitates an accurate quality-analysis of the object, either by AI or any other rule-based automated or semi-automated systems. As the manufactured-objects may be of any arbitrary-shape, the image-alignment procedures are not generic and rather specific to shape objects. For example, the polygonal-shaped objects are aligned with a procedure or method that is substantially-different from elliptical objects.

To put it differently, alignment depends on the shape of the object. Different objects require different alignment methods: e.g. rectangular object, circular object etc. Alignment of objects on a predetermined position of the image is very helpful as it helps image inspection based artificial intelligence (AI) model learn and generalize better.

Accordingly, it is commonplace to spend-time and energy and develop customized-alignment methods that are specifically fine-tuned for each object shape/type. Having said so, one usually ends up spending too-much time in creating separate new alignment-algorithms for each type of object.

There lies at-least a need for an adjustable method for assisting alignment of objects in an image-frame in visual-inspection tasks.

There lies a need for a generic and effective method for assisting alignment of any type of non-deformable objects in visual-inspection tasks.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for predicting a condition of living-being in an environment.

The present subject matter refers a method for training image-alignment procedures in a computing environment. The method comprises communicating one or more images of an object to a user and receiving a plurality of user-selected zones within said one or more through a user-interface. An augmented data-set is generated based on said one or more images comprising the user-selected zones, wherein such augmented data set comprises a plurality of additional images defining variants of said one or more communicated images. Thereafter, a machine-learning based image alignment is trained based on at-least one of the augmented data set and the communicated images.

In accordance with other embodiment, the present subject matter refers a method for training image-alignment procedures for facilitating image-inspection. The method comprises communicating one or more images of an object to a user and receiving a plurality of user-selected zones within said one or more images through a user-interface. An augmented data is generated based on said one or more image comprising the user-selected zones, wherein the augmented data-set comprises a plurality of additional images defining variants of said one or more communicated images. Thereafter, a machine-learning based image alignment method is trained based on at-least one of the augmented data set and the communicated images. The machine-learning based image alignment method is executed with respect to a real-time image data and thereafter the aligned images are communicated for image-inspection.

The present subject matter at-least proposes a generic-method for enabling image alignment for in turn facilitating visual-inspection tasks, irrespective of any type and shape of objects. In an example and without limiting the scope of the present subject matter, the present subject matter at-least provides a generic deep-learning based, "minimally-supervised" method for 2D (affine) alignment of any type of non-deformable objects in visual inspection tasks.

The objects and advantages of the embodiments will be realized and achieved at-least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present subject matter are described below in detail with reference to the accompanying drawings.

Figure 1:
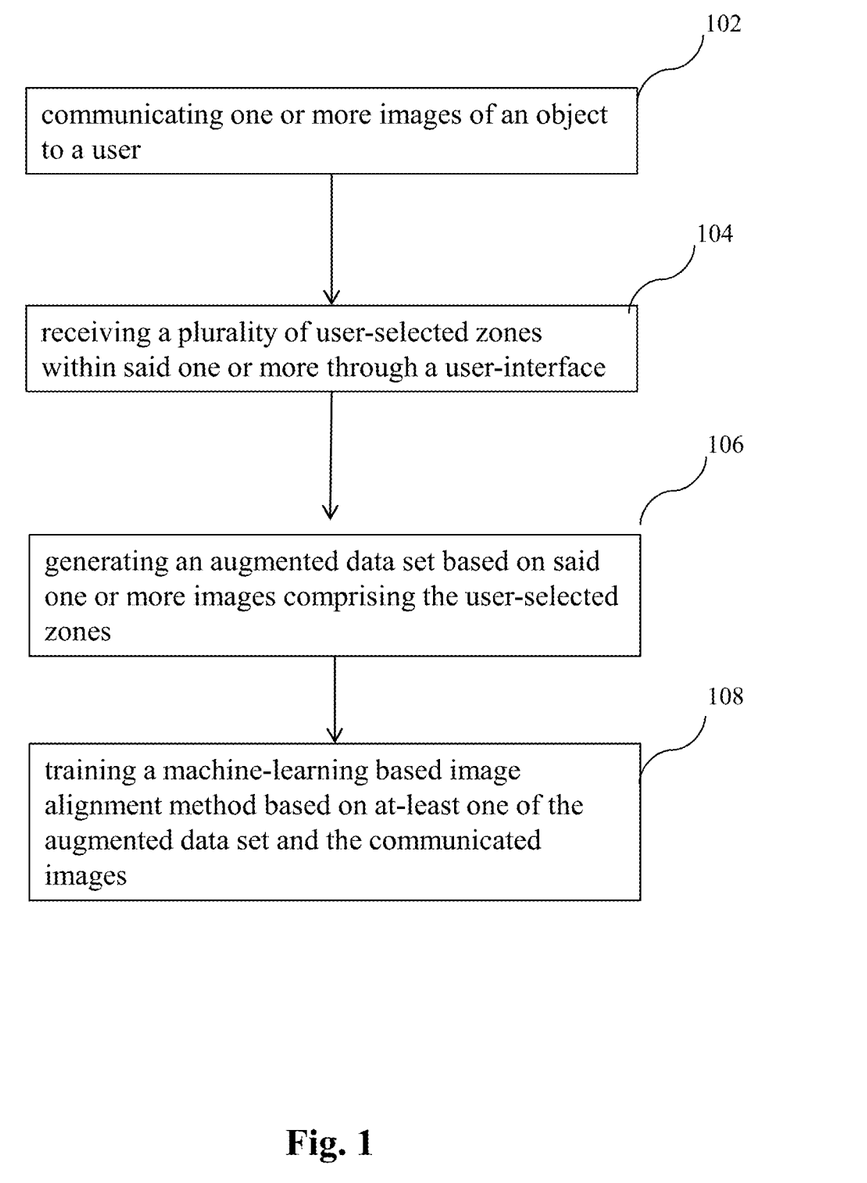
FIG. 1 illustrates a method for training image0alignment procedure, in accordance with the embodiment of the present disclosure.

FIG. 1 illustrates a method for training image-alignment procedures in a computing environment. The method comprises communicating (step 102) one or more images of an object to a user. In an implementation, such communication of the one or more images to the user comprises shortlisting the image having a substantially less-distortion to thereby facilitate an ease of selection of the zones by the user through the user interface. The communicated images as shortlisted may constitute training data.

The method further comprises receiving (step 104) a plurality of user-selected zones within said one or more through a user-interface. The plurality of user selected-zones are defined by one or more of a plurality of point-selections within the communicated images or the user-selected zones may be the plurality of portions selected by a user within the communicated images. The plurality of user selected-zones within the communicated images are defined by at least one of: a plurality of corners of the object, a plurality of edges of the object, one or more boundaries of the object, and a free-form shape drawn by the user within the communicated-images to localize the object. The plurality of user selected-zones within the communicated-images corresponds to a set of common-features of the object across the plurality of images.

The method further comprises (step 106) generating an augmented-data set based on the one or more images comprising the user-selected zones. The augmented data-set comprises a plurality of additional-images defining variants of said one or more communicated images. The variants of the images are obtained by identifying the object within the one or more communicated images based on the user-selected zone of step (104). The identified object within one or more communicated images is subjected to the at-least one of: rotation, inversion, scaling, and displacement. Thereafter, the variants of the one or more communicated-images forming a part of the augmented data set are generated based on said type of subjection meted out to the identified object.

The method further comprises training (step 108) a machine-learning based image-alignment method (e.g. deep learning) based on at-least one of the augmented data-set and the communicated images. Such communicated one or more images and the augmented data set define at least one of: a training data set, a validation data set; and a testing data set.

In an implementation, the machine learning (ML) based image alignment method comprises operating upon a generic ML image alignment procedure through undergoing training through a training data set as a part of training phase, detecting an object within an real-time image data set; and modifying a position of the detected object with respect to an image frame within the real-time image data set to thereby align the object within the image-frame in accordance with a pre-defined standard. The machine learning based image alignment method is at least one of: a deep learning procedure and a convolution neural network.

The method further comprises executing the machine-learning based image alignment method with respect to real-time image data, and communicating the aligned images with respect to the real-time image data to an image-inspection procedure as a part of image quality-control process.

Figure 2:
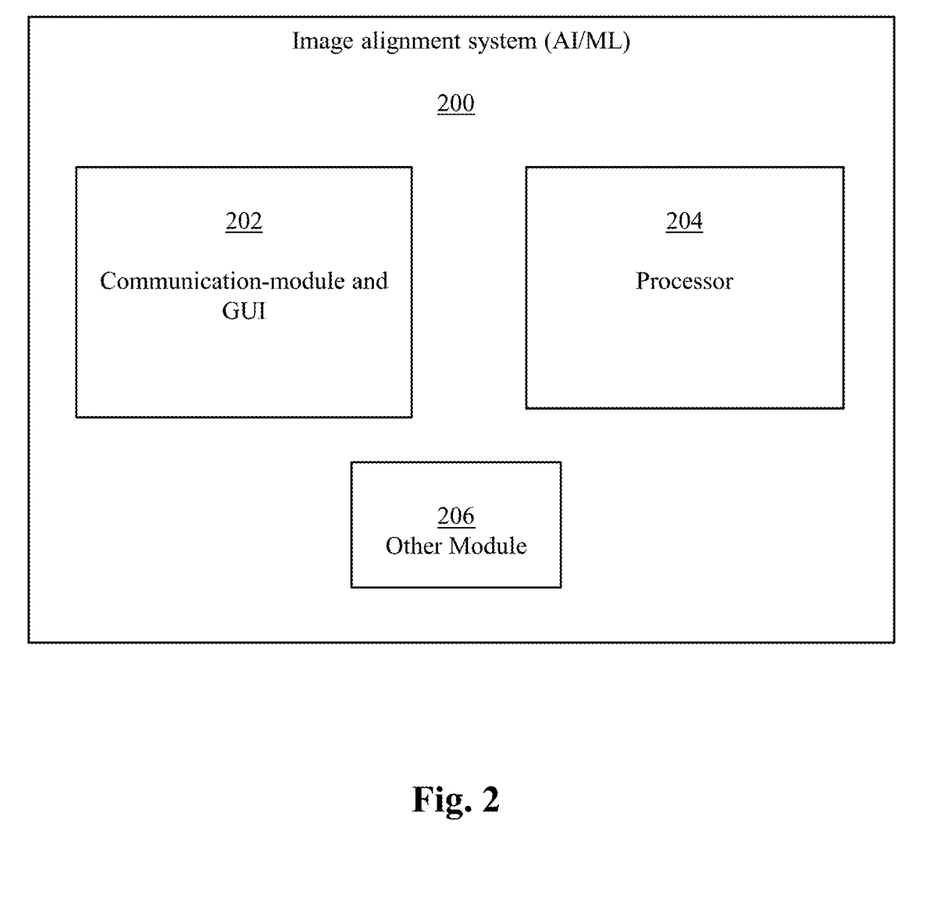
FIG. 2 illustrates a system based on the method of FIG. 1, in accordance with an embodiment of the present disclosure.

FIG. 2 illustrates a schematic-architecture or a system 200 for training image-alignment procedures in a computing environment. The system 200 comprises a communication-interface and GUI 202 (e.g. annotation tool) for executing the method steps 102 and 104, and a processor 204 for executing the steps 106 and 108. Likewise, there may be a miscellaneous module 206 within the system 200 that facilitate operational-interconnection among 202 till 204, and performs other ancillary-functions.

Figure 3A:
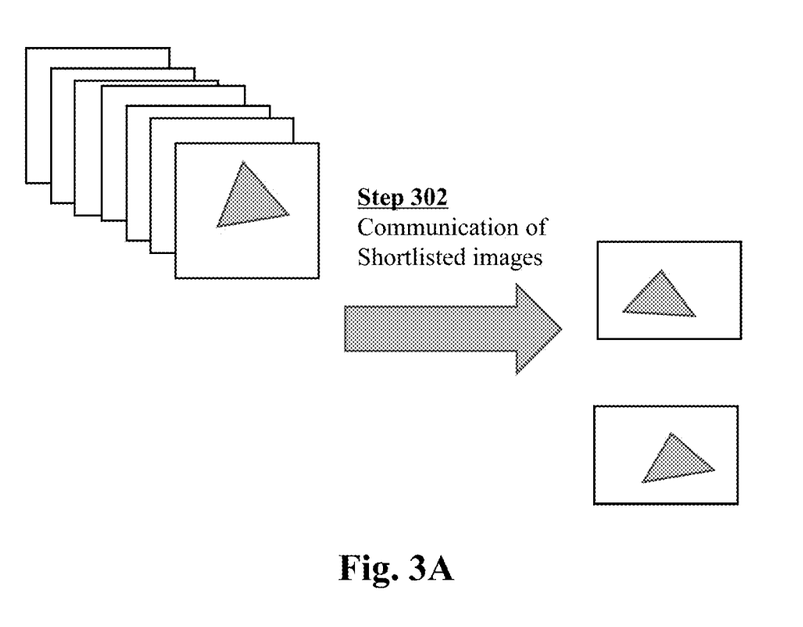
FIGS. 3A and 3B illustrate an example implementation of method steps, in accordance with another embodiment of the present disclosure.
Figure 3B:
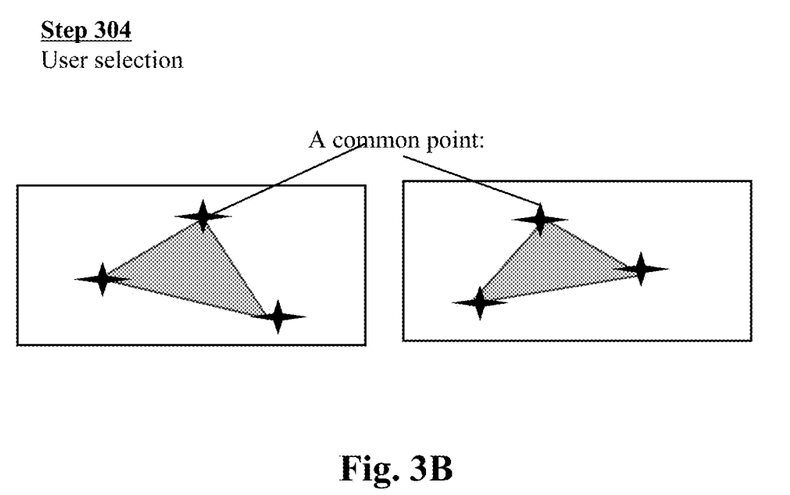

FIGS. 3A and 3B illustrates example process steps for training image-alignment procedures for facilitating image-inspection.

FIG. 3A illustrates an example step of communicating (step 302) one or more shortlisted images of an object to a user and accordingly corresponds to step 102. The communication of the one or more images to the user comprises shortlisting the image having a substantially less-distortion (or noise) to thereby facilitate an ease of selection of the zones by the user through the user-interface or annotation tool. Such shortlisting may be defined by a user performed manual shortlisting of the images (say 2 images) out of the plurality of images. In other example, that refers automated shortlisting, a dendrogram may be executed to cause automatic shortlisting of distortion free or noiseless images.

FIG. 3B illustrates receiving (step 304) a plurality of user-selected zones within said one or more images through a user-interface and accordingly corresponds to step 104. The plurality of user selected-zones are defined by two or more point-selections executed by the user within the communicated images. Such plurality of user selected-zones within the communicated images corresponds to a set of common-features of the object across the plurality of images. In an example, the point selections in one image map with the selections in other image both in terms of type and position. A point that appears commonly across images may a corner, centroid, a center, eccentricity, an offset point from centre etc.

Figure 4A:
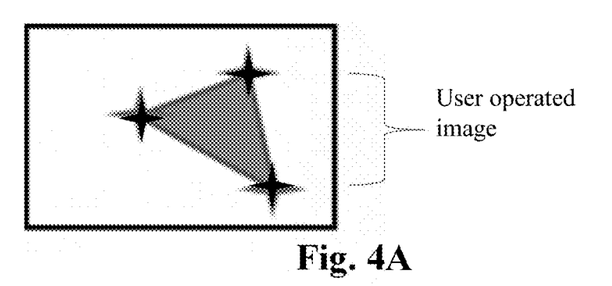
FIGS. 4A and 4B illustrate an example implementation of method steps, in accordance with another embodiment of the present disclosure.
Figure 4B:
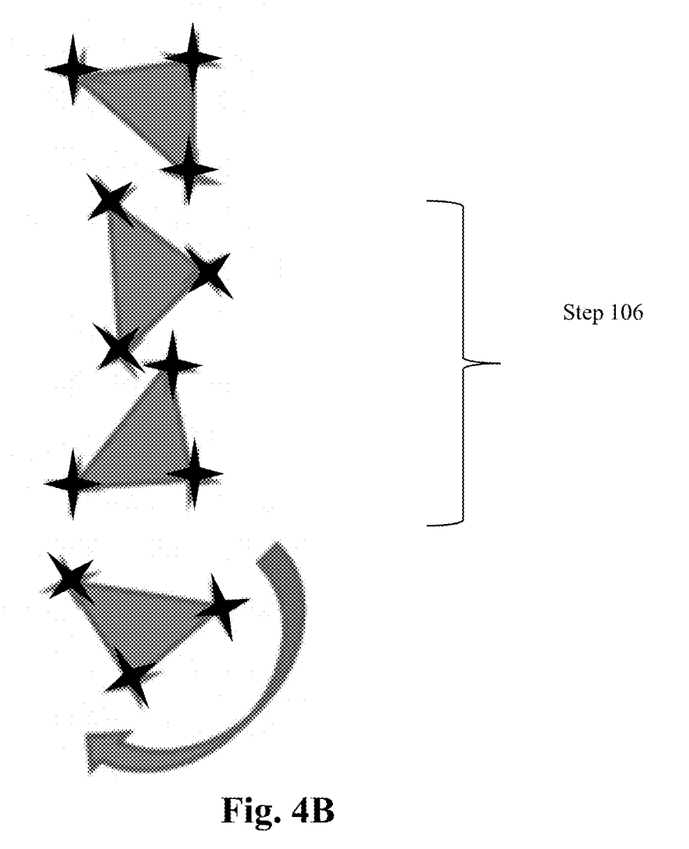

FIGS. 4A and 4B illustrate an example implementation of method steps, in accordance with another embodiment of the present disclosure. FIGS. 4A and 4B illustrates example process steps for training image-alignment procedures for facilitating image-inspection and corresponds to step 106 of FIG. 1.

FIG. 4A depicts the image with user-selected zones of FIG. 3B. In an example, an annotation tool that renders a user-interface for drawing user-selected zones save the position of these point selection as "ground truth" in the realm of machine learning. Subsequently, FIG. 4B corresponds to generating an augmented data set based on said one or more image comprising the user-selected zones. The augmented data set comprises a plurality of additional images defining variants of said one or more communicated images. The same includes subjecting the object within one or more communicated images to automatically undergo one or more image editing techniques defined by at-least one of: rotation, inversion, scaling, displacement. The variants of the one or more communicated images forming a part of the augmented data set are generated based on said image-editing techniques.

In an example, the annotation tool starts data augmentation by rotating, shifting and changing the aspect ratio of the object detected in the image as bounded by user-selected zones. For each image, 3970 images for training may be obtained in an example.

Figure 5A:
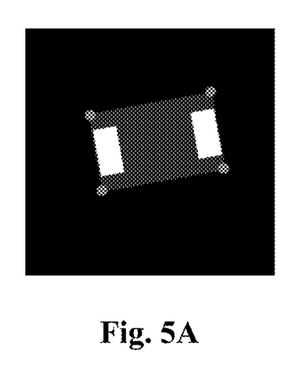
FIGS. 5A and 5B illustrate another example implementation of method steps, in accordance with another embodiment of the present disclosure.
Figure 5B:
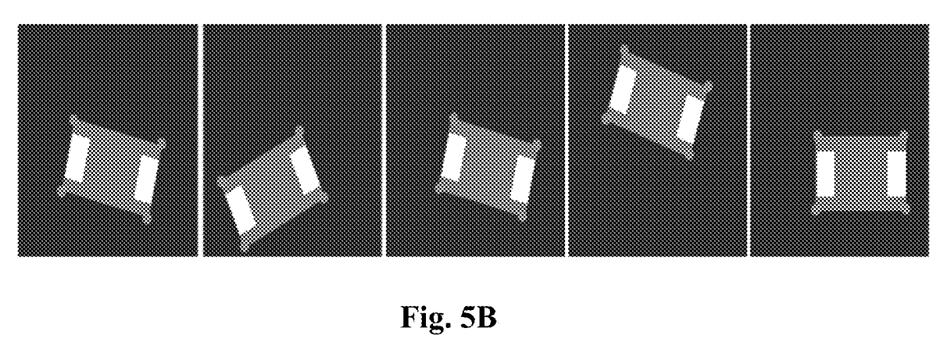

FIGS. 5A and 5B illustrate another example-implementation of method steps, in accordance with another embodiment of the present disclosure. More specifically. FIGS. 5A and 5B illustrates the method step 106 of FIG. 1 and the process as depicted in FIGS. 4A and 4B.

In an example, thousands of new synthetic images at different positions and rotations may be created from the annotated two or more images equivalent to what is represented in FIG. 5A. A single annotated image of FIG. 5A through rotation may lead to many annotated images as a part of data augmentation for alignment as depicted in FIG. 5B. Accordingly, based on augmented data set or synthetic data acting as the training, validation, and test data, a generic AI alignment system (e.g. a deep learning system) may be trained.

Figure 6A:
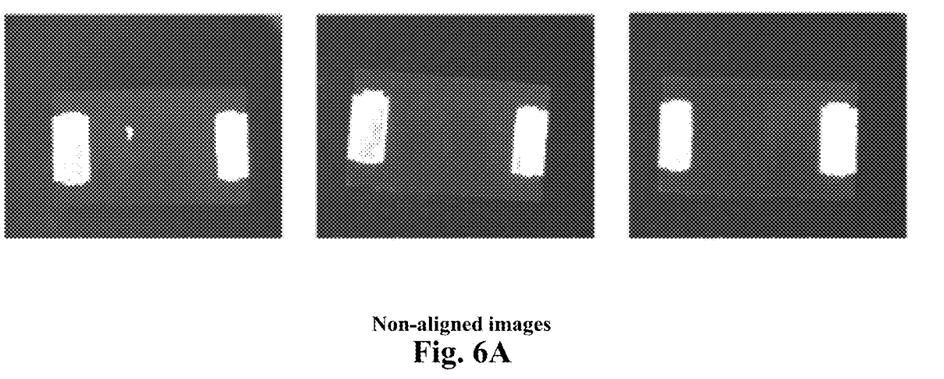
FIGS. 6A and 6B illustrate an example alignment of objects in an image frame, in accordance with another embodiment of the present disclosure.
Figure 6B:
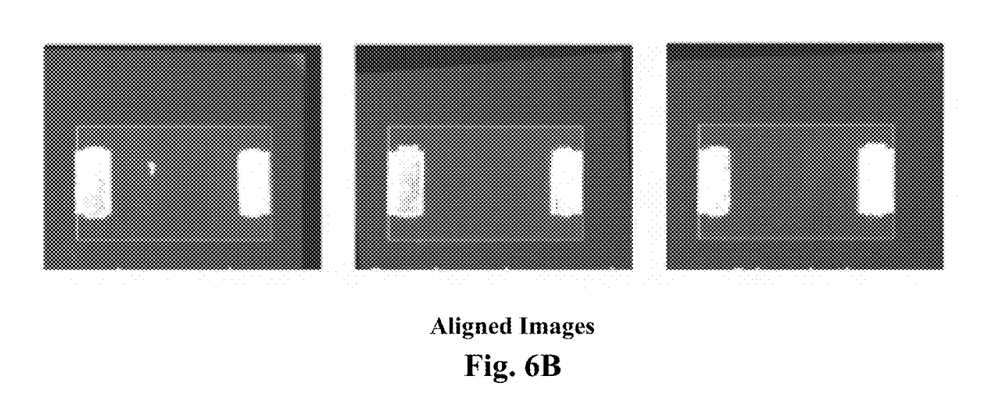

FIGS. 6A and 6B illustrate an example alignment of objects in an image frame, in accordance with another embodiment of the present disclosure. FIG. 6A illustrates unseen images or real-time data having objects in the images, such that objects need to be detected and aligned within the image frame before undergoing image inspection.

For such purposes, a machine-learning based image alignment method is trained based on at least one of the augmented data set and the communicated images in accordance with the method step 108. Such trained machine-learning based image alignment method is thereafter executed with respect to the real-time image data or unseen images in FIG. 6A for thereby obtaining aligned images for image inspection as depicted in FIG. 6B.

Finally, the one or more aligned images obtained in FIG. 6B are communicated to an image-inspection method for enabling a quality-control of the real-time image data. The image-inspection method is a machine learning method for certifying an image of an object as acceptable, permissible, unacceptable, and prone to be rejected, prone to be accepted.

FIGS. 7A-7E illustrate example objects with user-selected zones, in accordance with another embodiment of the present disclosure and accordingly depicts step 104 of FIG. 1. In an example, the annotation tool may be used by the user to select zones differently than point selections.

Figure 7A:
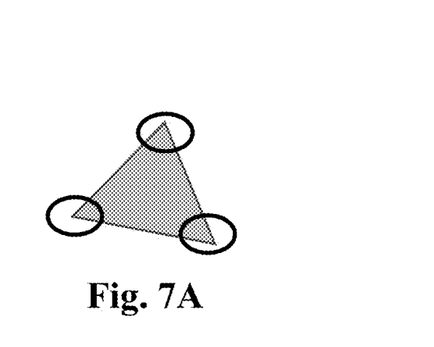
FIGS. 7A-7E illustrate example objects with user-selected zones, in accordance with another embodiment of the present disclosure.
Figure 7B:
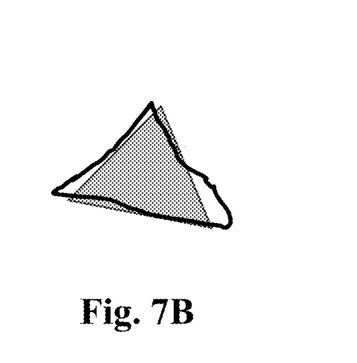
Figure 7C:
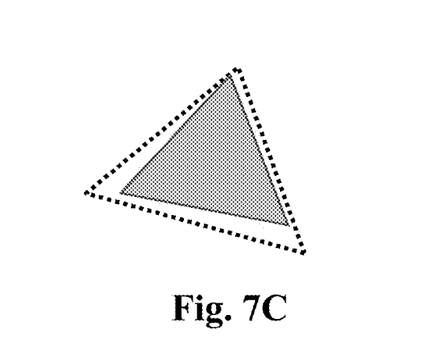

FIG. 7A depicts annotation of a triangular object by a user by selection of a plurality of corners of the triangular object by drawing circular portions within the communicated images. Likewise, the user may also select edges or boundary of the triangular object as shown in FIG. 7B and FIG. 7C by a free form or geometrical shape drawn by the user within the communicated images to localize the object.

Figure 7D:
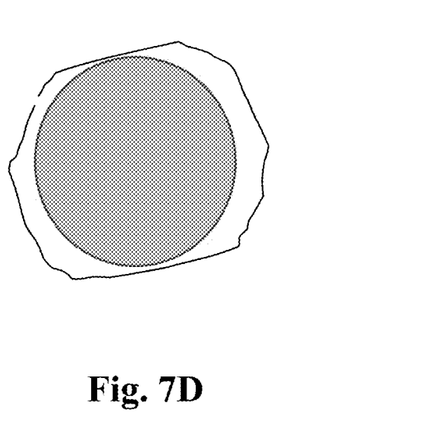
Figure 7E:
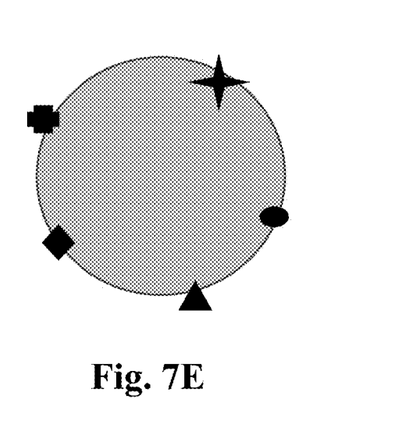

With respect to the object exhibiting a circular or elliptical shape as shown in FIG. 7D, the user may annotate the boundaries by a free-form boundary drawn by a user around the object as shown in FIG. 7D. With respect to the object exhibiting a circular or elliptical shape as shown in FIG. 7E, the user may also resort to positioning different shapes of point selections as landmarks or annotations to localize the circular object. This will ensure the augmentation phase of step 106 replicating the landmarks at the user-selected positions only upon the selected object, despite the rotation of images.

Figure 8:
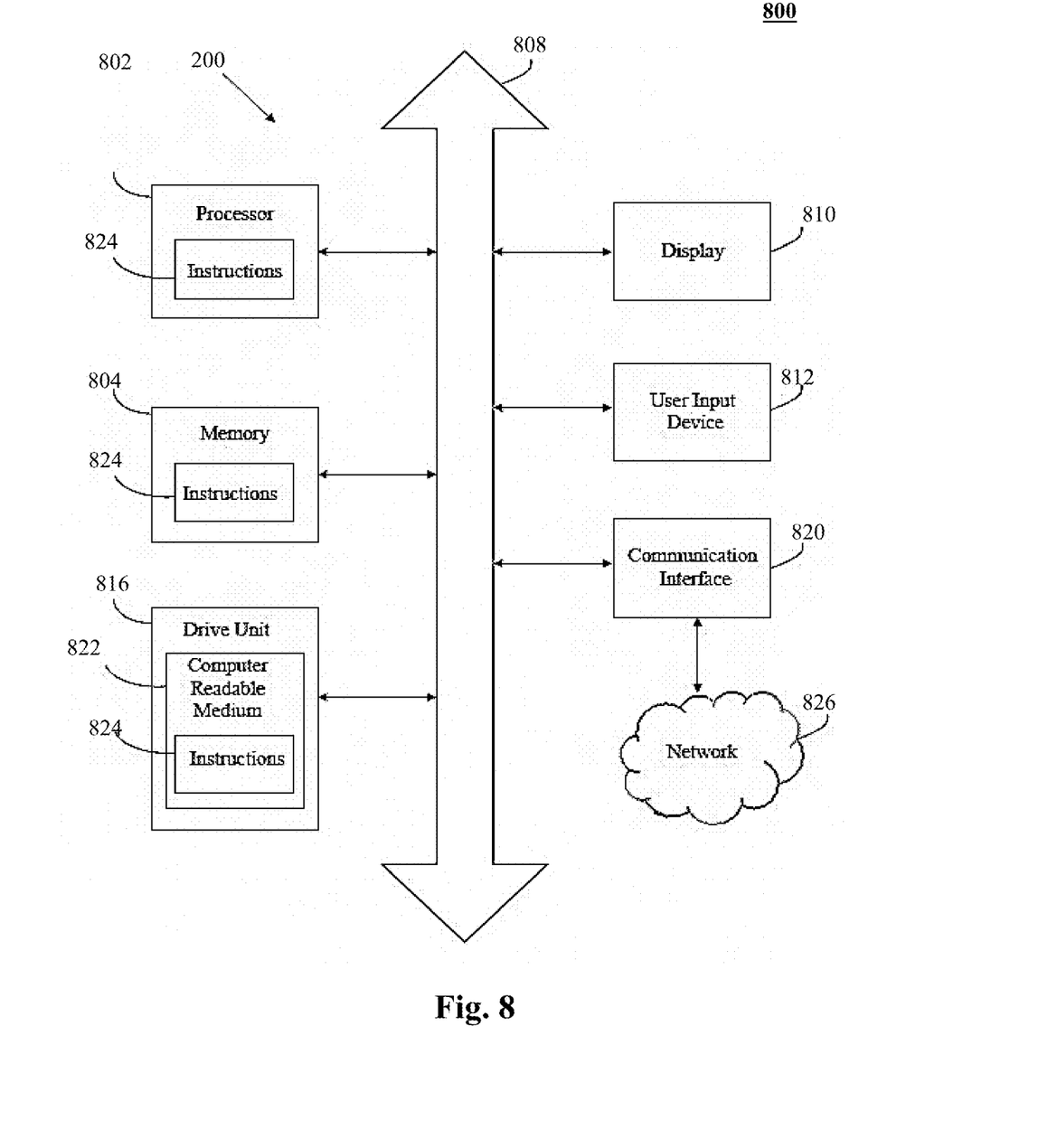
FIG. 8 illustrates an implementation of the system as illustrated in preceding figures in a computing environment, in accordance with another embodiment of the present disclosure.

FIG. 8 illustrates an implementation of the system 200 as illustrated in FIG. 2 in a computing environment. The present figure essentially illustrates the hardware configuration of the system 200 in the form of a computer system 800 is shown. The computer system 800 can include a set of instructions that can be executed to cause the computer system 800 to perform any one or more of the methods disclosed. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed)

network environment. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802 (e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data The processor 802 may implement a software program, such as code generated manually (i.e., programmed).

The computer system 800 may include a memory 804, such as a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 804 includes a cache or random access memory for the processor 802. In alternative examples, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 800 may or may not further include a display unit 810, such as a liquid crystal display (LCD), an organic light emitting diode (OLED), a flat panel display, a solid state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 816.

Additionally, the computer system 800 may include an input device 812 configured to allow a user to interact with any of the components of system 800. The input device 812 may be a number pad, a keyboard, or a cursor control device, such as a mouse, or a joystick, touch screen display, remote control or any other device operative to interact with the computer system 800.

The computer system 800 may also include a disk or optical drive unit 816. The disk drive unit 816 may include a computer-readable medium 822 in which one or more sets of instructions 824, e.g. software, can be embedded. Further, the instructions 824 may embody one or more of the methods or logic as described. In a particular example, the instructions 824 may reside completely, or at least partially, within the memory 804 or within the processor 802 during execution by the computer system 800. The memory 804 and the processor 802 also may include computer-readable media as discussed above.

The present invention contemplates a computer-readable medium that includes instructions 824 or receives and executes instructions 824 responsive to a propagated signal so that a device connected to a network 826 can communicate voice, video, audio, images or any other data over the network 826. Further, the instructions 824 may be transmitted or received over the network 826 via a communication port or interface 820 or using a bus 808. The communication port or interface 820 may be a part of the processor 802 or may be a separate component. The communication port 820 may be created in software or may be a physical connection in hardware. The communication port 820 may be configured to connect with a network 826, external media, the display 810, or any other components in system 800 or combinations thereof. The connection with the network 826 may be a physical connection, such as a wired Ethernet connection or may be established wirelessly as discussed later. Likewise, the additional connections with other components of the system 800 may be physical connections or may be established wirelessly. The network 826 may alternatively be directly connected to the bus 808.

The network 826 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 800.

The present subject matter renders a generic method for 2D image alignment for visual inspection tasks. The method can be used for any type and shape of objects. In an example, the method is based on minimally-supervised learning. An automatic method in accordance with the present subject matter proposes very few (say 1-10) representative images for landmark annotation to the user. A deep learning based method may be used to align other similar images based on the landmarks annotated by the human operator. Overall, the present subject matter expedites an overall development time for AI visual inspection by using an adjustable generic AI alignment Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

What is claimed is:

1. A method for training image-alignment procedures in a computing environment, said method comprising:
   communicating one or more images of an object to a user;
   receiving a plurality of user-selected zones within said one or more through a user-interface;
   generating an augmented data set based on said one or more images comprising the user-selected zones, said augmented data set comprising a plurality of additional images defining variants of said one or more communicated images; and
   training a machine-learning based image alignment method based on at-least one of the augmented data set and the communicated images.

2. The method as claimed in claim 1, wherein the plurality of user selected-zones are defined by at least one of:
   i. a plurality of point-selections within the communicated images; and
   ii. a plurality of portions selected by a user within the communicated images.

3. The method as claimed in claim 1, further comprising:
   identifying the object within the one or more communicated images based on the user-selected zone;
   subjecting the identified object within one or more communicated images to at least one of: rotation, inversion, scaling, displacement; and
   generating the variants of the one or more communicated images forming a part of the augmented data set based on said subjection to the identified object.

4. The method as claimed in claim 1, wherein the communication of the one or more images to the user comprises shortlisting the image having a substantially less distortion to thereby facilitate an ease of selection of the zones by the user through the user interface.

5. The method as claimed in claim 1, wherein said communicated one or more images and the augmented data set define at least one of:
   a training data set;
   a validation data set; and
   a testing data set.

6. The method as claimed in claim 1, further comprising:
   executing the machine-learning based image alignment method with respect to real-time image data; and
   communicating the aligned images with respect to the real-time image data to an image-inspection procedure as a part of image quality-control process.

7. The method as claimed in claim 1, wherein the plurality of user selected-zones within the communicated images are defined by at least one of:
   a plurality of corners of the object;
   a plurality of edges of the object;
   one or more boundaries of the object; and
   a free form shape drawn by the user within the communicated images to localize the object.

8. The method as claimed in claim 7, wherein the plurality of user selected-zones within the communicated images correspond to a set of common-features of the object across the plurality of images.

9. The method as claimed in claim 1, wherein the machine learning (ML) based image alignment method comprises operating upon a generic ML image alignment procedure through one or more of:
   undergoing training through a training data set as a part of training phase;
   detecting an object within an real-time image data set; and
   modifying a position of the detected object with respect a frame within the real-time image data set to thereby align the object within the frame in accordance with a pre-defined standard.

10. The method as claimed in claim 9, wherein said machine learning based image alignment method is at least one of:
    a deep learning procedure and
    a convolution neural network.

11. A method for training image-alignment procedures for facilitating image-inspection, comprising:
    communicating one or more images of an object to a user;

receiving a plurality of user-selected zones within said one or more images through a user-interface;

generating an augmented data set based on said one or more image comprising the user-selected zones, said augmented data set comprising a plurality of additional images defining variants of said one or more communicated images;

training a machine-learning based image alignment method based on at least one of the augmented data set and the communicated images; and executing the machine-learning based image alignment method with respect to a real-time image data and communicating aligned images for image inspection.

12. The method as claimed in claim 1, wherein the plurality of user selected-zones are defined by two or more point-selections executed by the user within the communicated images.

13. The method as claimed in claim 1, further comprising:
subjecting the object within one or more communicated images to automatically undergo one or more image editing techniques defined by at least one of: rotation, inversion, scaling, displacement; and generating the variants of the one or more communicated images forming a part of the augmented data set based on said image-editing techniques.

14. The method as claimed in claim 1, wherein the communication of the one or more images to the user comprises shortlisting the image having a substantially less distortion to thereby facilitate an ease of selection of the zones by the user through the user-interface, said shortlisting defined by one or more of:
a user performed shortlisting through manual action; and
an execution of dendrogram to cause automatic shortlisting.

15. The method as claimed in claim 1, wherein the plurality of user selected-zones within the communicated images are defined by:
a plurality of corners or edges in case of a polygonal object;
a free-form boundary drawn by a user around the object exhibiting a circular or elliptical shape.

16. The method as claimed in claim 15, wherein the plurality of user selected-zones within the communicated images correspond to a set of common-features of the object across the plurality of images.

17. The method as claimed in claim 1, further comprising:
obtaining one or more aligned images from an operation of the machine-learning based image alignment procedure upon a real-time image data set of an object;
communicating the aligned-images to an image-inspection method for enabling a quality-control of the real-time image data.

18. The method as claimed in claim 17, wherein the image-inspection method is a machine learning method for certifying an image of an object as acceptable, permissible, unacceptable, prone to be rejected, prone to be accepted.

19. A non-transitory medium comprising computer-executable instructions which, when performed by processor cause the processor to train image-alignment procedures for facilitating image-inspection by the steps of:
communicating one or more images of an object to a user;
receiving a plurality of user-selected zones within said one or more images through a user-interface;
generating an augmented data set based on said one or more image comprising the user-selected zones, said augmented data set comprising a plurality of additional images defining variants of said one or more communicated images;
training a machine-learning based image alignment method based on at least one of the augmented data set and the communicated images; and
executing the machine-learning based image alignment method with respect to real-time image data and communicating aligned images to an image-inspection procedure.

* * * * *